G. S. WILLIAMSON.
METHOD OF UNITING PRINTING PRESS WEBS.
APPLICATION FILED NOV. 14, 1914.
1,217,253.
Patented Feb. 27, 1917.
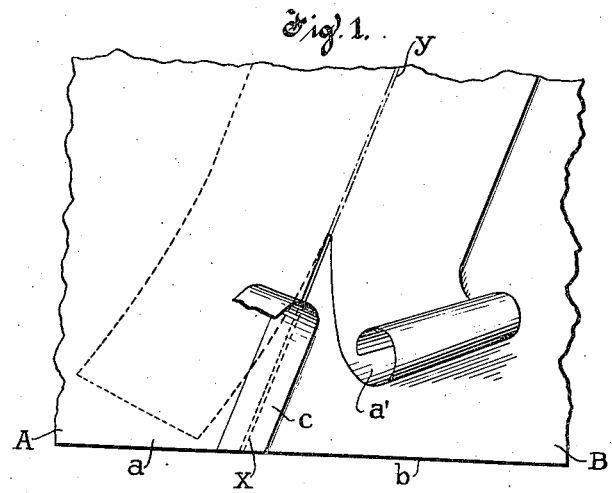
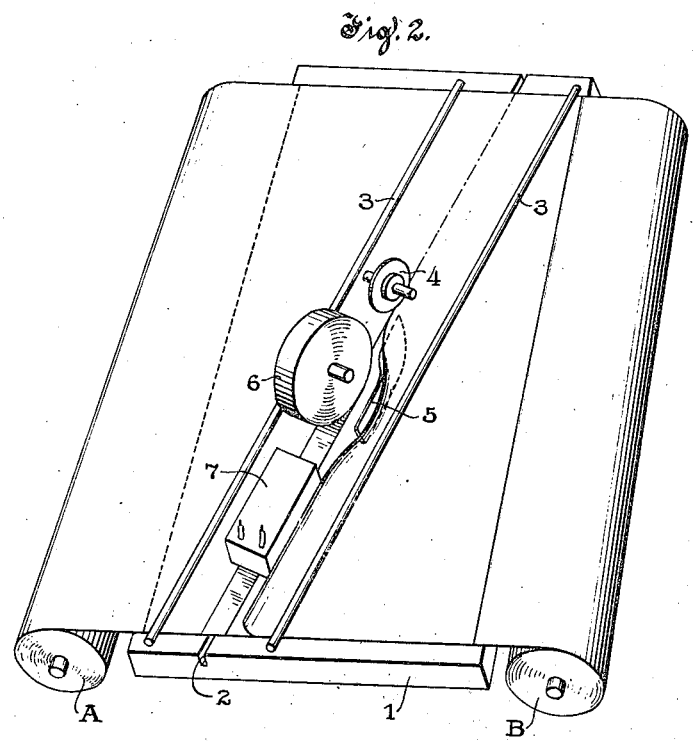
Witnesses
J. L. Johnson
Tekla Bast
Inventor
Glenn S. Williamson
By Frank H. Hubbard
Attorney

UNITED STATES PATENT OFFICE.

GLENN S. WILLIAMSON, OF NEW YORK, N. Y.

METHOD OF UNITING PRINTING-PRESS WEBS.

1,217,253.  Specification of Letters Patent.  Patented Feb. 27, 1917.

Application filed November 14, 1914. Serial No. 872,114.

*To all whom it may concern:*

Be it known that I, GLENN S. WILLIAMSON, a citizen of the United States, residing at New York, in the county of New York and State of New York, have invented new and useful Improvements in Methods of Uniting Printing-Press Webs, of which the following is a full, clear, concise, and exact description, reference being had to the accompanying drawing, forming a part of this specification.

This invention relates to an improved method of uniting or splicing together pieces of paper and the like.

The invention may, in practice, be advantageously employed in numerous instances. For example, it has been used to great advantage in uniting or splicing together the stubs of printing press rolls to form a new roll, thus enabling the utilization of material previously treated as waste.

The various objects and advantages of the invention will appear from the following description of the method exemplified in the accompanying drawing, in which, Figure 1 shows schematically two pieces of material partially cut and partially united, and, Fig. 2 shows schematically means for performing the several steps of the method in a preferred relation.

Briefly described, the method exemplified in Fig. 1 consists in overlapping the ends of the pieces of material to be united, then severing the overlapped ends on a common line, whereby they will present abutting cut edges, then displacing the waste end of the upper piece and finally applying a sealing strip along the line of severance to overlap and adhere to both pieces of material. Also, as will be hereinafter more fully explained, the method contemplates performance of the aforesaid progressive steps in overlapping relation or in other words, substantially simultaneously, but this is not imperative.

Referring more specifically to Fig. 1 the same shows two pieces of material A and B which, for brevity, will be termed "webs". In carrying out the method the two webs are first overlapped with their margins $a$ and $b$ in alinement. Then the overlapped webs are severed on a common line $x$—$y$ preferably obliquely disposed or on a bias with respect to the web $c$. Then the severed end $a'$ of the upper web is displaced, leaving the cut edges of both webs exposed and in an abutting relation. The webs are then ready to be united and this is accomplished by applying along the line $x$—$y$ a sealing strip $c$ to overlap and adhere to both webs. The sealing strip may be of any desired material, such for example, as thin rubber coated tissue paper or the like and where such material is employed the method also includes heating of the same during application to effect adhesion thereof to the webs.

To facilitate and expedite the uniting or splicing of the webs, it is preferred to displace the waste end of the upper web as the cutting progresses and to apply the sealing strip as the displacement of the waste material progresses, as provided for by the means schematically shown in Fig. 2. As shown in Fig. 2 the two webs are supported on a table 1 provided with a cutting groove 2 and are held in position on the table by clamping strips 3 to be traversed by a suitable traveling device or carriage provided with a rotary cutter 4, a waste-displacing plow 5, a roll 6 of sealing strip and a heated pressure device 7 for applying said strip. The relative arrangement of the parts 4, 5, 6, and 7 is such that upon simultaneous movement of the same, the plow 5 displaces the waste material as the cutting progresses and the sealing strip is withdrawn from the roll and applied by the heated device 7 as the waste material is displaced.

It will thus be observed that the method described is exceedingly simple and expeditious and provides for a neat and secure splice of the webs. In the latter connection it will be noted that the splice is smooth and only exceeds the thickness of one web by that of the sealing strip which may be very thin. Further, it will be noted that the strength of the splice is increased and the resistances thereof to press rolls is decreased by disposing the same on a bias with respect to the webs.

While the method has been described in connection with webs of printing presses, it should be understood that it may be employed for uniting materials of various kinds. Further, it should be understood that the method may be carried out by the use of any preferred means and that the method is not limited to the application of the sealing strip or other sealing medium in the specific manner illustrated and described.

What I claim as new and desire to secure by Letters Patent is:

1. The method of uniting pieces of sheet material consisting in arranging the pieces to be united in alinement and with their extremities overlapped in an opposed relation, then severing the overlapped extremities of the pieces on a common line and then removing the severed extremity of one piece and sealing the pieces together with their cut edges in a parallel relation.

2. The method of uniting pieces of sheet material consisting in arranging the pieces to be united in alinement and with their ends overlapped in an opposed relation, then severing the overlapped ends of the pieces on a common bias line and then removing the severed portion of the upper piece and sealing the pieces together with their cut edges in a parallel relation.

3. The method of uniting pieces of paper or the like, consisting in overlapping the same, then cutting the overlapping portions on a common line, then displacing the severed end of one piece to expose the end of the other piece and then applying a uniting strip to the two pieces across the line of severance thereof.

4. The method of uniting pieces of paper or the like, consisting in simultaneously trimming the adjacent ends of the two pieces on corresponding lines and applying a uniting strip to the pieces as the trimming thereof progresses.

5. The method of uniting printing press webs or the like, consisting in overlapping the webs, then cutting the overlapping portions thereof on a common line from margin to margin, and displacing the severed portion of the upper web and applying a uniting strip to both webs along the aforesaid line as the cutting progresses.

In witness whereof, I have hereunto subscribed my name in the presence of two witnesses.

GLENN S. WILLIAMSON.

Witnesses:
J. H. TALBET MARTIN,
FRANK S. LOW.